United States Patent
Baum et al.

(10) Patent No.: US 7,405,263 B2
(45) Date of Patent: Jul. 29, 2008

(54) POLYMER FOR WATER TREATMENT

(75) Inventors: Pia Baum, Weinheim (DE); Erich Lutz, Ludwigshafen (DE); Marcus Guzmann, Leimen (DE); Karl-Heinz Buechner, Altlussheim (DE); Gregor Brodt, Heppenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 163 days.

(21) Appl. No.: 10/555,338

(22) PCT Filed: May 6, 2004

(86) PCT No.: PCT/EP2004/004809

§ 371 (c)(1), (2), (4) Date: Nov. 3, 2005

(87) PCT Pub. No.: WO2004/099092

PCT Pub. Date: Nov. 18, 2004

(65) Prior Publication Data

US 2007/0055022 A1    Mar. 8, 2007

(30) Foreign Application Priority Data

May 6, 2003    (DE) ............................... 103 20 388

(51) Int. Cl.
*C08F 20/06*    (2006.01)
*C08F 120/06*   (2006.01)
*C08F 220/06*   (2006.01)

(52) U.S. Cl. .................... 526/317.1; 526/318; 526/319; 526/325; 526/329.7; 526/307.3; 526/287

(58) Field of Classification Search .............. 526/317.1, 526/318, 319, 325, 329.7, 307.3, 287
See application file for complete search history.

(56) References Cited

U.S. PATENT DOCUMENTS

| | | | | |
|---|---|---|---|---|
| 3,898,037 A | * | 8/1975 | Lange et al. | 422/16 |
| 4,301,266 A | * | 11/1981 | Muenster et al. | 526/212 |
| 4,450,013 A | * | 5/1984 | Hirsch et al. | 524/424 |
| 4,711,725 A | * | 12/1987 | Amick et al. | 210/701 |
| 4,801,388 A | | 1/1989 | Fong et al. | |
| 4,919,821 A | * | 4/1990 | Fong et al. | 210/698 |

FOREIGN PATENT DOCUMENTS

| | | |
|---|---|---|
| DE | 31 23 732 | 12/1982 |
| DE | 199 50 941 | 4/2001 |
| EP | 0 244 584 | 11/1987 |
| EP | 0 330 876 | 9/1989 |

* cited by examiner

*Primary Examiner*—Ling-Siu Choi
(74) *Attorney, Agent, or Firm*—Oblon, Spivak, McClelland, Maier & Neustadt, P.C.

(57) ABSTRACT

A description is given of (meth)acrylic acid copolymers comprising methacrylic acid units and units based on isopropanol, the polymer being functionalized with aminoalkylsulfonic acid. In addition, a description is given of a process for the preparation thereof and the use thereof for watertreatment, scale inhibition in mineral oil extraction and corrosion inhibition in aqueous systems.

4 Claims, No Drawings

POLYMER FOR WATER TREATMENT

The present invention relates to (meth)acrylic acid copolymers, a process for the preparation thereof and to the use thereof for watertreatment, preferably in cooling and heating processes, and in scale inhibition in mineral oil extraction.

In the extraction of mineral oil, during the extraction process, owing to temperature changes and mixing of deposit water with injection water, precipitation of carbonates and sulfates of alkaline earth metals occurs. They block the pores of the formation and are deposited on pipe surfaces, which makes extraction more difficult and sometimes impossible.

In watertreatment, in cooling or heating processes including seawater desalination, or generally in heat-transfer processes, to the respective cooling or heating medium are generally added formulations which prevent, or at least greatly delay, corrosion and deposition in the circuits. For this, use is made of formulations which, depending on requirements, comprise zinc salts, polyphosphates, phosphonates, polymers, biocides and/or surfactants.

A distinction is made in principle between two processes for controlling corrosion prevention and deposition prevention in open cooling circuits:

Firstly, phosphorus-containing formulations can be used in the cooling or heating media. Typical examples of these are polyphosphates and phosphonates such as 1-hydroxyethane-1,1-diphosphonic acid (HEDP), 2-phosphonobutane-1,2,4-tri-carboxylic acid (GBTC), and aminotrimethylenephosphonic acid (ATMP), each of which is used in the form of its sodium salts. These phosphorus-containing formulations generally effect a hardness stabilization. Polyphosphates, moreover, enhance corrosion inhibition.

Alternatively, zinc salts can also be used in cooling and heating media, the zinc ions present therein chiefly serving to protect steel.

In some cases, zinc salts are also added to the phosphonates in small amounts, in order, in addition to hardness stabilization, to protect the steel used simultaneously.

The effects of these additives are reinforced by suitable polymers:

Suitable polymers can firstly reinforce the action of phosphonates for hardness stabilization and, secondly, they can also stabilize polyphosphates, in particular when these are used at high concentrations. This prevents calcium phosphate precipitation. In addition, suitable polymers can also stabilize zinc compounds, so that deposition on the metal surface, and thus destruction of the protective film, do not occur. The anticorrosion action is explained in the example of phosphonates by a film forming on the metal surface. This separates the steel from the cooling or heating medium. The majority of the film which forms consists of iron(II) and calcium ions and the incorporated phosphonate. The film is extremely thin, so that stabilization must be ensured so that it does not collapse and allow corrosion to occur at individual points.

Polymers suitable for stabilizing phosphonates and phosphates are known in principle in the prior art.

For instance, EP-A 0 244 584 describes N-substituted acrylamides which bear sulfoethylamide groups and are used to inhibit corrosion in industrial cooling circuits. These N-substituted acrylamides are prepared by transamidation of polymeric acrylamides. The N-substituted acrylamides according to EP-A 0 244 584 inhibit the phosphate ions, but not the phosphonate ions.

EP-B 0 330 876 describes N-substituted acrylamides structurally analogous to EP-A 0244 584. The use according to EP-B 0 330 876 of these N-substituted acrylamides relates, however, to stabilizing iron in aqueous systems.

U.S. Pat. No. 4,801,388 describes processes for preventing deposition in aqueous systems by adding polymers based on (meth)acrylic acid and sulfoalkyl(meth)acrylamide and (meth)acrylamide.

DE-A-199 50 941 relates to the use of polymers of acrylic acid as inhibitors of calcium sulfate deposits in wood pulp production and in paper reprocessing. These polymers are prepared by free-radical polymerization, in isopropanol, of acrylic acid with, if appropriate, at least one other ethylenically unsaturated monomer which is polymerizable with acrylic acid.

The polymers of the abovementioned prior art have the disadvantage that they precipitate out at relatively high calcium concentrations. In particular in the case of the simultaneous use of phosphonate ions and zinc ions in cooling and heating circuits, furthermore, polymers are advantageous which simultaneously have a stabilizing action both on phosphonate ions and on zinc ions. In addition, polymers are advantageous which prevent precipitation of calcium phosphate when polyphosphate additions are used and in particular in the presence of calcium ions at high concentration. Finally, polymers are desirable which disperse solid particles in general, so that deposition thereof on the metal surfaces of the cooling or heating systems is avoided. These requirements are not met, or are only met inadequately, by the polymers of the prior art.

It is an object of the present invention to provide polymers which reinforce the hardness-stabilizing action of phosphonates and simultaneously stabilize polyphosphates in the respective medium in cooling or heating circuits, so that precipitation does not occur, for example, in the presence of calcium ions. Furthermore, the inventive polymers are to stabilize zinc compounds so that these cannot cause deposits on the metal surfaces of cooling and heating circuits.

We have found that this object is achieved by (meth)acrylic acid copolymers which comprise (a) from 50 to 80% by weight, preferably from 50 to 75% by weight, particularly preferably from 55 to 70% by weight, of a poly(meth)acrylic acid basic structure, (b) from 1 to 40% by weight, preferably from 5 to 20% by weight, particularly preferably from 7 to 15% by weight, of at least one unit which is bound to the basic structure and is selected from the group consisting of isobutene units, terelactone units and isopropanol units and (c) from 5 to 50% by weight, preferably from 5 to 40% by weight, particularly preferably from 10 to 30% by weight, of amide units based on aminoalkylsulfonic acids, the total weight of the units in the (meth)acrylic acid copolymer being 100% by weight and all weights being based in the (meth)acrylic acid copolymer.

The inventive (meth)acrylic acid copolymers prevent, even in the substoichiometric range, too many calcium ions penetrating into the film on the metal surfaces of, for example, cooling and heating circuits.

For the purposes of the present invention, (meth)acrylic acid copolymers are methacrylic acid polymers, acrylic acid polymers and mixed polymers of methacrylic acid and acrylic acid. In a preferred embodiment of the present invention, the inventive polymer comprises a polyacrylic acid basic structure. For the purposes of the present invention, terelactone units are units of the following structure:

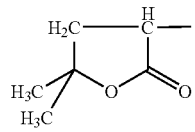

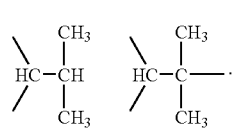

The weight-average molecular weight of the inventive (meth)acrylic acid copolymers is preferably from 1 000 to 20 000 g/mol, particularly preferably from 1 500 to 10000 g/mol, in particular from 2 000 to 6 000 g/mol. The weight-average molecular weight is determined by gel-permeation chromatography (=GPC) at room temperature using aqueous elution media.

The inventive (meth)acrylic acid copolymers have a K value of preferably from 5 to 50, particularly preferably from 8 to 35, in particular from 11 to 16. The K value was determined in accordance with Fikentscher (ISO 174, DIN 53726).

If appropriate, the inventive (meth)acrylic acid copolymers can additionally comprise units of other ethylenically unsaturated monomers which can be copolymerized with (meth)acrylic acid. Monomers suitable for this are, for example, monoethylenically unsaturated carboxylic acids such as maleic acid, fumaric acid, itaconic acid, mesaconic acid, methylenemalonic acid and citraconic acid. Other copolymerizable monomers are $C_1$-$C_4$-alkyl esters of monoethylenically unsaturated carboxylic acids such as methyl acrylate, ethyl acrylate, methyl methacrylate, ethyl methacrylate, hydroxyethyl acrylate, hydroxyethyl methacrylate, hydroxypropyl acrylate, hydroxypropyl methacrylate and hydroxybutyl acrylate. Suitable monomers are, in addition, alkyl polyethylene glycol (meth)acrylates which are derived from polyalkylene glycols having from 2 to 50 ethylene glycol units, monoallyl ethers of polyethylene glycols having from 2 to 50 ethylene glycol units and allyl alcohol. Other suitable monomers are acrylamide, methacylamide, N-vinylformamide, styrene, acrylonitrile, methacrylonitrile and/or monomers bearing sulfonic acid groups and also vinyl acetate, vinyl propionate, allyl phosphonate, N-vinylpyrrolidone, N-vinylcaprolactam, N-vinylimidazole, N-vinyl-2-methylimidazoline, diallyldimethylammonium chloride, dimethylaminoethyl acrylate, diethylaminoethyl acrylate, dimethylaminoethyl methacrylate and diethylaminoethyl methacrylate. The basic monomers such as dimethylaminoethyl methacrylate can be used as comonomers for example in the form of the free bases, as salts with strong acids such as with hydrochloric acid, sulfuric acid or phosphoric acid, or in the form of quaternized compounds. Likewise, the above-mentioned monomers containing acid groups can be used in the polymerization in the form of the free acids or as salts, for example the sodium, potassium or ammonium salts.

The inventive (meth)acrylic acid copolymer has at least one unit which is bound to the poly(meth)acrylic acid basic structure and is selected from the group consisting of isobutene units, terelactone units and isopropanol units.

If isobutene units are present in the inventive polymer, their amount is, for example, from 0.5 to 3.0 mol %. In further embodiments, the amount of isobutene units present can be from 0.8 to 2.5 mol %, or from 1.0 to 2.0 mol %.

The terelactone units can be present not only in the terminal position but also in the polymer chain.

The inventive (meth)acrylic acid copolymers preferably have in addition at least one of the following structural units:

The amide units based on aminoalkylsulfonic acids can be derived from any desired aminoalkylsulfonic acid. Particularly suitable aminoalkylsulfonic acids are those having from 2 to 12 carbons, preferably from 4 to 10 carbons. The amino groups can be primary, secondary or tertiary. As further substituents, the aminoalkylsulfonic acid can contain, for example, hydroxyl or alkoxy groups or halogen atoms. The alkyl groups can be unsaturated or preferably saturated, unbranched or branched, or closed to form a ring. The amino groups can be disposed within the chain of the aminoalkyl groups or as pendant or terminal substituents. They can also be a component of a preferably saturated heterocyclic ring.

In a preferred embodiment of the present invention, the inventive (meth)acrylic acid copolymer contains the structural unit (II) based on aminoethanesulfonic acid (taurine):

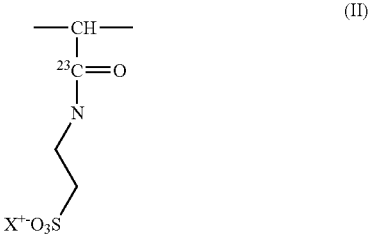

Generally, the sulfonate radical valencies of the (meth)acrylic acid copolymers can be saturated with any desired counter ion. Preferably, the counter ion is selected from the group consisting of protons, alkali metal ions or ammonium ions.

The sulfoalkylamide structural units are preferably randomly distributed in the (meth)acrylic acid copolymer.

The inventive (meth)acrylic acid copolymers differ markedly in their mode of action in watertreatment, scale inhibition and in corrosion protection from the pure (meth)acrylic acid/sulfoethylacrylamide copolymers, (meth)acrylic acid/acrylamide/sulfoethylacrylamide terpolymers and also from copolymers of acrylic acid and 2-acrylamido-2-methylpropanesulfonic acid (AMPS) of the prior art. They exhibit, in particular, a greater inhibition toward calcium phosphate and calcium phosphonate.

This characteristic mode of action is due to the polymer units which are formed by the incorporation of the isopropanol or of the resultant isobutene or terelactone units and if appropriate due to the preferably random distribution of the sulfoalkylamide structural units The present invention further relates to a process for preparing (meth)acrylic acid copolymers, which comprises the following process steps:
(1) free-radical polymerization of (meth)acrylic acid in the presence of isopropanol with or without water, with a polymer I resulting, and
(2) amidating the polymer I originating from process step (1) by reaction with at least one aminoalkanesulfonic acid.

This process is suitable, for example, for preparing the above-described inventive (meth)acrylic acid copolymers.

The process step (1) is carried out at temperatures of preferably from 100 to 200° C., particularly preferably from 105 to 135° C., in particular from 120 to 125° C.

Process step (1) is preferably carried out in a closed reaction vessel, for example an autoclave. The pressure in process step (1) generally results from the vapor pressure (autogeneous pressure) of isopropanol with or without water at the abovementioned temperatures. Independently thereof, if appropriate, additional pressure or reduced pressure can also be employed.

The process step (1) is preferably carried out in isopropanol, or in aqueous solutions containing at least 20% by weight of isopropanol, particularly preferably at least 25% by weight, in particular at least 30% by weight.

The free-radical polymerization of the monomers is preferably performed using hydrogen peroxide as initiator. However, as polymerization initiators, use can be made of all compounds which form free radicals under the reaction conditions, for example peroxides, hydroperoxides, peroxodisulfates, peroxodicarboxylic acids, peroxocarboxylic acid esters and/or azo compounds.

If appropriate, in process step (1) of the inventive process, further monomers can be used in addition, for example ethylenically unsaturated monomers which can be copolymerized with (meth)acrylic acid. Suitable copolymers are, for example, monoethylenically unsaturated carboxylic acids such as maleic acid, fumaric acid, itaconic acid, mesaconic acid, methylenemalonic acid and citraconic acid. Further copolymerizable monomers are $C_1$-$C_4$-alkyl esters of monoethylenically unsaturated carboxylic acids such as methyl acrylate, ethyl acrylate, methyl methacrylate, ethyl methacrylate, hydroxyethyl acrylate, hydroxyethyl methacrylate, hydroxypropyl acrylate, hydroxypropyl methacrylate and hydroxybutyl acrylate. In addition, suitable comonomers are alkylpolyethylene glycol (meth)acrylates which are derived from polyalkylene glycols having from 2 to 50 ethylene glycol units, monoallyl ethers of polyethylene glycols having from 2 to 50 ethylene glycol units and allyl alcohol. Further suitable monomers are acrylamide, methacylamide, N-vinylformamide, styrene, acrylonitrile, methacrylonitrile and/or monomers bearing sulfonic acid groups such as vinyl acetate, vinyl propionate, allyl phosphonate, N-vinylpyrrolidone, N-vinylcaprolactam, N-vinylimidazole, N-vinyl-2-methylimidazoline, diallyldimethylammonium chloride, dimethylaminoethyl acrylate, diethylaminoethyl acrylate, dimethylaminoethyl methacrylate and diethylaminoethyl methacrylate. The basic monomers such as dimethylaminoethyl methacrylate can be used as comonomers, for example in the form of the free bases, as salts with strong acids such as with hydrochloric acid, sulfuric acid or phosphoric acid, or in the form of quaternized compounds. Likewise, the abovementioned monomers containing acid groups can be used in the polymerization in the form of free acids, or as salts, for example the sodium, potassium or ammonium salts.

In a particular embodiment of the present invention the content of (meth)acrylic acid in polymer I is from 75 to 95% by weight, preferably from 80 to 90% by weight, particularly preferably from 82.5 to 87.5% by weight. The content of units based on isopropanol in polymer I is then preferably from 5 to 25% by weight, preferably from 10 to 20% by weight, particularly preferably from 12.5 to 17.5% by weight.

The polymer I obtainable by process step (1) of the inventive process preferably contains isobutene units in an amount of preferably from 0.5 to 3.0 mol %, particularly preferably from 0.8 to 2.5 mol %, in particular from 1.0 to 2.0 mol %. The isobutene units can if appropriate be disposed in the terminal position in polymer I.

In a further embodiment of the present invention, the polymer I contains terelactone units which are disposed in the terminal position or in the polymer chain of the polymer I.

In a further embodiment of the present invention, the polymer I contains not only isobutene units but also terelactone units.

The inventive process can preferably be carried out in such a manner that the (meth)acrylic acid copolymer contains sulfonate groups together with a counter ion which is selected from the group consisting of protons, alkali metal ions or ammonium ions. However, generally, the valencies of the sulfonate radicals of the (meth)acrylic acid copolymers can be saturated with any desired counter ion.

The polymer I obtainable in process step (1) of the inventive process is preferably obtained in a polymer solution which has a solids content of preferably from 10 to 70%, particularly preferably from 30 to 60%, in particular from 45 to 55%.

In a particular embodiment of the inventive process, before the amidation of the polymer I in process step (2), the polymer solution comprising polymer I is adjusted to a pH of preferably from 2.0 to 9.0, particularly preferably from 4.0 to 7.5, in particular from 4.5 to 6.5. Suitable compounds for this are in principle all bases, but preference is given to using aqueous solutions of alkali metal hydroxides, for example aqueous sodium hydroxide solution.

The amidation (process step (2)) is preferably carried out under a protective gas atmosphere, for example with the use of argon or nitrogen.

The process step (2) of the inventive process is preferably carried out at temperatures of from 140 to 250° C., particularly preferably from 165 to 200° C., in particular from 175 to 185° C. The molar ratio of monomer units in polymer I to aminoalkanesulfonic acid is preferably from 15:1 to 2:1, particularly preferably from 11:1 to 3:1, in particular from 8:1 to 4:1. The pressure in process step (2) is preferably from 1 to 25 bar, particularly preferably from 5 to 17 bar, in particular from 7 to 13 bar.

The (meth)acrylic acid copolymer resulting from process step (2) by the inventive process preferably contains at least one of the following structural units based on isopropanol:

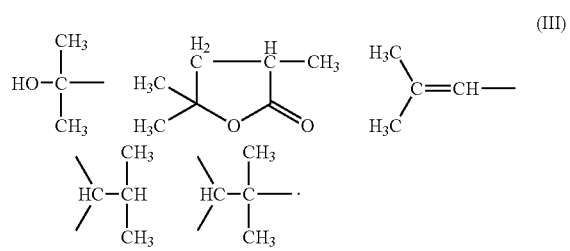

(III)

Particularly preferably, the (meth)acrylic acid copolymer obtainable by the inventive process contains isobutene units and/or terelactone units. The isobutene units are preferably disposed in the (meth)acrylic acid copolymer in the terminal position, whereas the terelactone units can be present not only in the terminal position but also in the polymer chain.

These different structural units are generally formed in accordance with the following reaction scheme (IV):
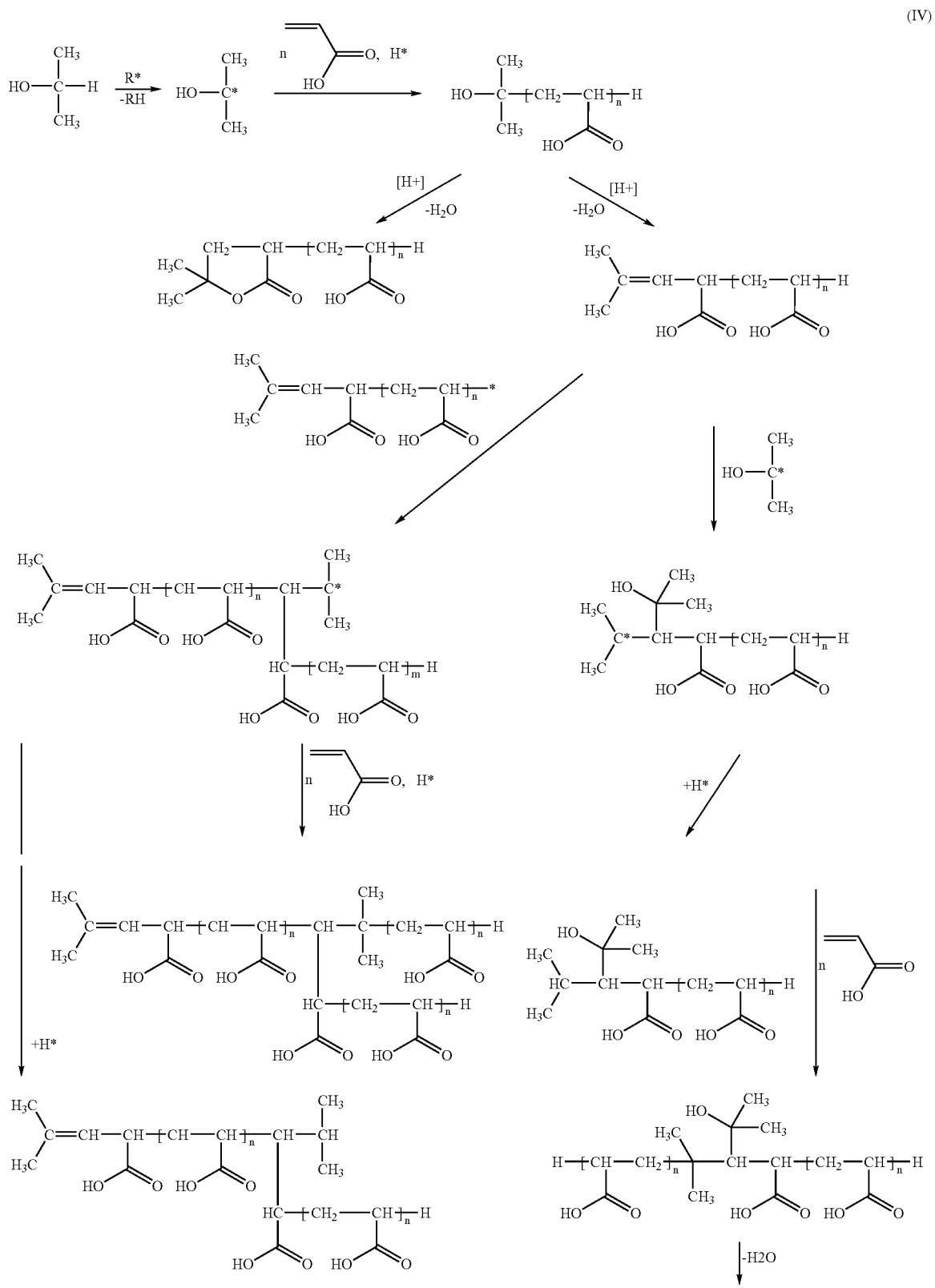
(IV)

-continued

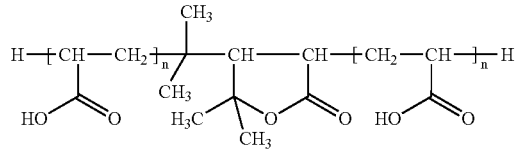

The (meth)acrylic acid copolymer obtainable by the inventive process preferably has a weight-average molecular weight of from 1 000 to 20 000 g/mol, particularly preferably from 1 500 to 10 000 g/mol, in particular from 2 000 to 6 000 g/mol. The weight-average molecular weight is determined by gel-permeation chromatography (=GPC) at room temperature using aqueous elution media.

In a particular embodiment of the inventive process, the aminoalkylsulfonic acid used is aminoethylsulfonic acid so that the polymer resulting from process step (2) contains units based on aminoethylsulfonic acid. However, any other aminoalkylsulfonic acids can also be used. In this regard, reference is made to above remarks.

In a particular embodiment of the inventive process, (meth) acrylic acid copolymers are prepared which comprise
(a) from 50 to 80% by weight, preferably from 50 to 75% by weight, particularly preferably from 55 to 70% by weight, of a poly(meth)acrylic acid basic structure,
(b) from 1 to 40% by weight, preferably from 5 to 20% by weight, particularly preferably from 7 to 15% by weight, of at least one unit which is bound to the basic structure and is selected from the group consisting of isobutene units, terelactone units and isopropanol units and
(c) from 5 to 50% by weight, preferably from 5 to 40% by weight, particularly preferably from 10 to 30% by weight, of amide units based on aminoalkylsulfonic acids, the total weight of the units in the (meth)acrylic acid copolymer being 100% by weight and all weights being based on the inventive (meth)acrylic acid copolymer. Further particular embodiments have already been mentioned in the description of the inventive poly(meth)acrylic acid copolymers.

The sulfoalkylamide structural units produced by process step (2) of the inventive process are preferably randomly distributed in the (meth)acrylic acid copolymer:

The type of free-radical polymerization reaction in process step (1) critically affects the distribution of the sulfoalkylamide units among the individual polymer molecules and along a polymer chain. Thus, generally, a mixture of polymer chains of different structure is obtained than by the free-radical copolymerization of monomers of corresponding structure. Thus polymers prepared by polymer-analogous means can differ markedly from polymers which are obtained by the free-radical copolymerization of the acrylamide monomer with acrylic acid and subsequent transamidation of the amide units with aminoalkylsulfonic acid. A free-radical copolymerization of acrylic acid, terelactonic acid and acrylamide with subsequent transamidation also generally leads to other structures. In the case of the last-described polymerizations, the distribution of the sulfoalkylamide units is predetermined by the copolymerization parameters of the monomers used in the free-radical copolymerization. The result is that the statistics of the distribution of different functional groups on the polymer backbone in the case of polymers synthesized by polymer-analogous is generally different from that on introduction of corresponding groups by free-radical copolymerization.

The present invention further relates to (meth)acrylic acid copolymers which are obtained by the above-described process.

In addition, the present invention relates to a process for stabilizing phosphates, phosphonates and/or zinc ions, for example zinc chloride or zinc phosphate, in aqueous systems, at least one inventive (meth)acrylic acid copolymer and/or at least one (meth)acrylic acid copolymer obtainable by the inventive process being added to the system. The amount of the polymer in the aqueous system is preferably from 5 to 200 ppm, particularly preferably from 5 to 50 ppm, in particular from 10 to 40 ppm, in each case based on the aqueous system.

The inventive polymers can be added to the aqueous system directly via one or more metering points, or else can be introduced in a mixture with other components.

The above-described inventive (meth)acrylic acid copolymers and/or (meth)acrylic acid copolymers obtainable by the inventive process can be used for watertreatment, scale inhibition in mineral oil extraction and/or for corrosion inhibition in aqueous systems.

If appropriate it can be expedient to use the inventive (meth)acrylic acid copolymers in formulations. The present invention thus further relates to formulations for watertreatment, scale inhibition in petroleum production and/or for corrosion inhibition, which formulations comprise at least one inventive (meth)acrylic acid copolymer and/or at least one (meth)acrylic acid copolymer obtainable by the inventive process. If appropriate, the inventive formulations may comprise further constituents. Such formulation constituents are, for example:
a) condensed linear and cyclic polyphosphates, such as sodium triphosphate, sodium hexametaphosphate;
b) phosphonates, such as 2-phosphonobutane-1,2.4-tricarboxylic acid, aminotri(methylenephosphonic acid), 1-hydroxyethylene-(1,1-diphosphonic acid), ethylenediaminetetramethylenephosphonic acid, hexamethylenediaminetetramethylenephosphonic acid or diethylenetriaminepentamethylenephosphonic acid,
c) aminocarboxylates such as nitrilotriacetic acid, ethylenediaminetetra-acetic acid, diethylenetriaminepentaacetic acid, hydroxyethylethylenediaminetriacetic acid, methylglycinediacetic acid, gluconate, glucono-heptanate, ethylenediaminedisuccinate and iminodisuccinate;
d) water-soluble polymers, such as homopolymers and copolymers of sulfone-containing monomers, such as 2-acrylamido-2-methylpropane-sulfonic acid, styrene-sulfonic acid or vinylsulfonic acid having a weight-average molecular weight of from 500 to 15 000, or napthalene-sulfonic acid—formaldehyde polycondensates, in addition to other formulation constituents such as surfactants, dispersants, antifoams, corrosion inhibitors, oxygen scavengers and biocides.

The formulation which comprises the inhibitory or dispersant polymers can also be added directly to the aqueous system via one or more metering points.

The present invention is illustrated on the basis of the examples hereinafter.

EXEMPLARY EMBODIMENTS

1.) Preparation of Inventive Polymers a) A polymer is prepared from isopropanol units and acrylic acid in accordance with DE-A 199 50 941 (process step (1)).

b) A mixture of 1 000 g of the polymer solution from a) (solids content=50%) and 96.56 g of taurine (aminoethanesulfonic acid) is charged into a pressure-stable reaction vessel equipped with stirrer, nitrogen feed, temperature sensor, pressure indicator and venting facility. This mixture is adjusted to a pH of 5.0 using 427 g of a 50% strength aqueous sodium hydroxide solution. The apparatus is flushed three times with nitrogen and closed. The mixture is then heated with stirring to an internal temperature of 180° C. In the course of this a pressure of approximately 12 bar builds up. The mixture is held at this temperature for 5 hours. The mixture is then cooled without depressurization. The apparatus is opened and adjusted to a pH of 7.2. A clear yellow solution having a solids content of 47.6% and a K value of 12.7 (1% strength in 3% NaCl solution) is obtained.

c) The reaction is performed in a similar manner to example b), only that 217.27 g of taurine and 266 g of the 50% strength sodium hydroxide solution were used at the start. A clear yellow solution having a solids content of 50% and a K value of 11.9 (1% strength in 3% NaCl solution) is obtained.

2.) Use of Polymers to Inhibit Calcium Phosphate and Calcium Phosphonate a) Calcium Phosphate Inhibition The basis is testing the inhibitory action of polymers for the use in cooling water circuits.

Apparatus: Dr. Lange Photometer, type LP2W
  Filter 435 nm
    Suction apparatus equipped with 0.45 µm membrane filter
    Shaking waterbath (GFL model 1083)
    300 ml Lupolene beaker (sealable)
    Disposable cuvettes (4 ml, Ratiolab)
    Sartorius balance type LC 4800-P
  Reagents: Vanadate/molybdate reagent for phosphate determination (Merck)
    Test solution A: make up 0.42 g of $H_3PO_4$ solution (5%) to 1 l with distilled water
    Test solution B: 1.64 g/l of $CaCl_2.6H_2O$
      0.79 g/l of $MgSO_4.7H_2O$
      1.08 g/l of $NaHCO_3$
    Polymer solution: 0.1% strength, based on active substance Procedure: 100 ml of test solution A are charged into the Lupolene beakers, 2-4 ml of 0.1% strength polymer solution are metered in (10-20 ppm) and then 100 ml of test solution B are added. After sealing the beakers they are placed into the shaking bath for 24 h at 70° C. After cooling them (approximately 1 h), the sample solutions are suction-filtered through membrane filters (0.45 µm). 50 ml of the suction-filtered solution are then taken for determining the amount of residual phosphate, by adding 10 ml of the vanadate/molybdate reagent. After 10 minutes of reaction time the phosphate content can then be determined on the photometer on the basis of calibration curves.

| Concentration of test solution: | GH = | 5.4 mmol/l |
| --- | --- | --- |
| | KH = | 6.42 mmol/l |
| | $PO_4$ = | 10 ppm |
| | Polymer = | 10-20 ppm of active substance |

TABLE

| | Inhibition [%] | | |
| --- | --- | --- | --- |
| | Concentration | | |
| | 15 ppm | 20 ppm | 25 ppm |
| Taurine-modified polymer (according to the invention) | 87 | 92 | 100 |
| Noramer 2000 (Rohm & Haas) (not according to the invention) | 73 | 87 | 96 | b) Calcium Phosphonate Inhibition

The basis is testing the inhibitory action of polymers for the use in cooling circuits.

Apparatus: Dr. Lange Photometer, type LP2W, filter 800 nm
  Suction apparatus equipped with 0.45 µm membrane filter
  Shaking waterbath (GFL model 1083)
  300 ml Lupolene beaker (sealable)
  Dr. Lange ready-to-use test LCK 350
  Sartorius scales type LC 4800-P
Reagent: Test solution A:
  2.2 g/l of HEDP 1% strength WS (Dequest 2010), or 5.7 g/l of PBTC 1% strength WS (Bayhibit AM) or 2.1 g/l of ATMP 1% strength WS (Dequest 2000) are made up to 1 l with distilled water
  Test solution B:
    1.64 g/l of $CaCl_2.6H_2O$
    0.79 g/l of $MgSO_4.7H_2O$
    1.08 g/l of $NaHCO_3$
    0.1% of polymer solution based on active substance Procedure: 100 ml of test solution A are initially charged into the Lupolene beakers, 2-4 ml of 0.1% strength polymer solution (10-20 ppm) are metered in and then 100 ml of test solution B are added. After the beakers are sealed, they are placed into the shaking bath for 24 hours at 70° C. After they are cooled (approximately 1 hour), the sample solutions are suction-filtered through a membrane filter (0.45 µm). The amount of phosphonate inhibited is then determined using the Dr. Lange ready-to-use LCK 350.

| Concentration of test solution: | |
| --- | --- |
| GH = | 5.4 mmol/l |
| KH = | 6.42 mmol/l |
| $PO_4$ = | 10 ppm |
| Polymer = | 10-20 ppm of active substance |

TABLE

| | Inhibition [%] Concentration | | |
|---|---|---|---|
| | 15 ppm | 20 ppm | 30 ppm |
| Taurine-modified polymer (according to the invention) | 70 | 94 | 100 |
| Noramer 2000 (Rohm & Haas) (not according to the invention) | 52 | 84 | 89 |

The polymer Normer 2000 (Rohm & Haas) is a copolymer of acrylic acid (80%) and 2-acrylamido-2-methylpropane-sulfonic acid (AMPS) (20%).

The inventive polymer has an increased calcium phosphate and phosphonate inhibition compared with the polymer of the prior art. This effect is particularly pronounced when substoichiometric amounts are used.

3. Examples of Formulations for Watertreatment, in Particular for Cooling Water

| a) Polymer/zinc formulation (phosphate-free) | | | |
|---|---|---|---|
| i) | inventive polymer | 40% | (antideposition, zinc stabilization) |
| ii) | zinc chloride | 25% | (corrosion control) |
| iii) | tolyltriazole | 0.5% | (corrosion control) |
| iv) | antifoam | 2% | (wetting) |
| v) | biocide | | (microorganism control) |
| b) Organic formulation (free from phosphate and heavy metals) | | | |
| i) | inventive polymer | 20-25% | (phosphonate stabilization, dispersion of sludge) |
| ii) | phosphonate (HEDP PBTC) | +10-20% | (antideposition, corrosion inhibition) |
| iii) | tolyltriazole | 2-5% | (corrosion control) |
| iv) | antifoam | 1-3% | (wetting) |
| v) | biocide | | (microorganism control) |
| HEDP = 1-Hydroxyethane-1,1-diphosphonic acid, sodium salt | | | |
| PBTC = 2-Phosphonobutane-1,2,4-tricarboxylic acid, sodium salt | | | |
| c) Phosphate/phosphonate formulation | | | |
| i) | inventive polymer | 20% | (phosphate inhibition, phosphonate inhibition) |
| ii) | phosphonate/ phosphonate | 5-15% | (corrosion control, antideposition) |
| iii) | tolyltriazole | 2-5% | (corrosion control) |
| iv) | antifoam | 1-3% | (wetting) |

4. Determination of the Mean Molecular Weight

The weight-average molecular weight was determined by gel-permeation chromatography (=GPC) at room temperature using aqueous elution media (0.08 m TRIS buffer (TRIS=tris(hydroxymethyl)aminomethane) of pH=7 in distilled water+0.15 m NaCl+0.01 m $NaN_3$). The samples had a concentration of c=0.1% by mass, the injection volume was $V_{inj}$=200 μL. The method was calibrated with a broadly spread sodium polyacrylate calibration mixture. The chromatography column combination consisted of Waters Ultrahydrogel 1000, 500, 500 and TSK PW-XL 5000 (from Toso-Haas). A differential refractometer was used for detection.

We claim:

1. A process for preparing (meth)acrylic acid copolymers, which comprises the following process steps:
   (1) free-radical polymerization of (meth)acrylic acid in the presence of isopropanol with or without water, with a polymer I resulting, and
   (2) amidating the polymer I originating from process step (1) by reaction with at least one aminoalkanesulfonic acid,
   wherein the (meth)acrylic acid copolymers comprise
   (a) from 50 to 75% by weight of a poly(meth)acrylic acid basic structure,
   (b) from 5 to 20% by weight of at least one unit which is bound to the basic structure and is selected from the group consisting of isobutene units, terelactone units and isopropanol units, and
   (c) from 5 to 40% by weight of amide units based on aminoalkyl-sulfonic acids, the total weight of the units in the (meth)acrylic acid copolymer being 100% by weight and all weights being based on the (meth)acrylic acid copolymer.

2. The process as claimed in claim 1, wherein process step (1) is carried out at temperatures of from 100 to 200° C.

3. The process as claimed in claim 1, wherein process step (2) is carried out at temperatures of from 140 to 250° C.

4. The process as claimed in claim 1, wherein the molar ratio of monomers in polymer I to aminoalkanesulfonic acid is from 15:1 to 2:1.

* * * * *